J. D. DAVIS.
FRUIT LADDER AND CONVEYER.
APPLICATION FILED FEB. 21, 1918.

1,279,995.

Patented Sept. 24, 1918.

INVENTOR
JAMES D. DAVIS
BY Hazard & Miller
ATT'YS.

UNITED STATES PATENT OFFICE.

JAMES D. DAVIS, OF ALHAMBRA, CALIFORNIA, ASSIGNOR OF ONE-THIRD TO GRANT S. BICKSLER, OF ALHAMBRA, CALIFORNIA.

FRUIT LADDER AND CONVEYER.

1,279,995.   Specification of Letters Patent.   Patented Sept. 24, 1918.

Application filed February 21, 1918. Serial No. 218,463.

*To all whom it may concern:*

Be it known that I, JAMES D. DAVIS, a citizen of the United States, residing at Alhambra, in the county of Los Angeles and State of California, have invented new and useful Improvements in Fruit Ladders and Conveyers, of which the following is a specification.

My object is to make a portable ladder and provide a conveyer leading from the top of the ladder for discharging fruit, such as oranges, lemons, and the like, into a basket upon the ground.

Figure 1:
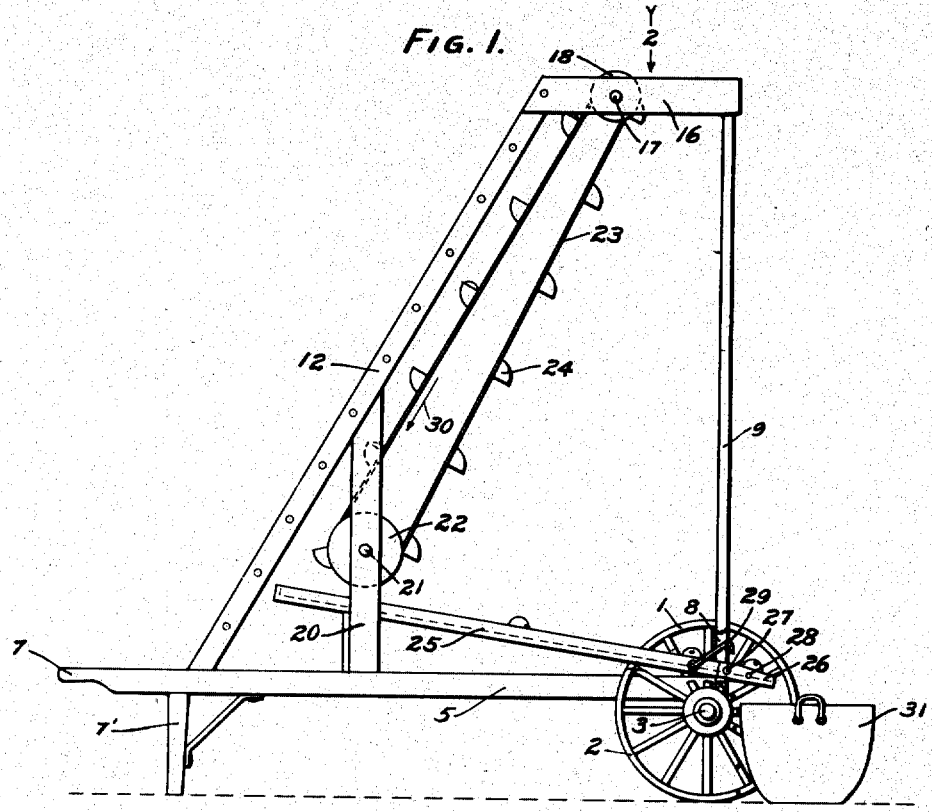
Figure 1 is a side elevation looking in the direction indicated by the arrow 1 in Fig. 2.
Figure 2:
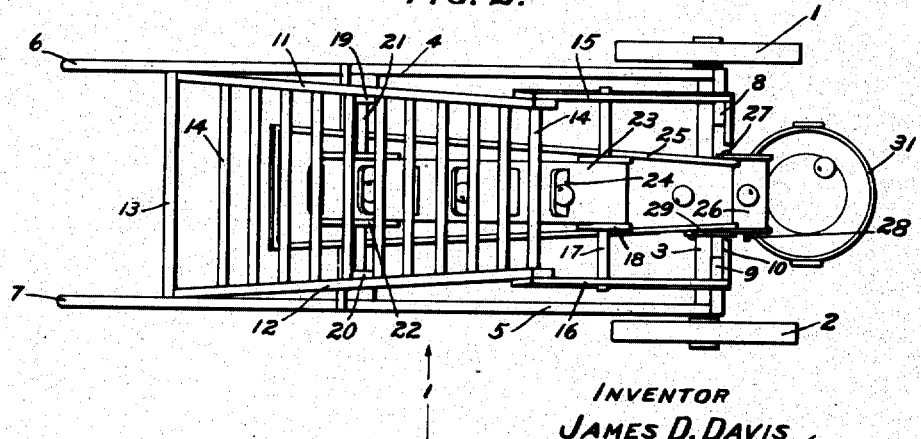
Fig. 2 is a top plan view.

The supporting wheels 1 and 2 are mounted upon an axle 3. Side bars 4 and 5 are rigidly fixed at their forward ends to the axle 3 and extend a considerable distance backwardly in parallel positions and have handles 6 and 7 upon their rear ends. Legs 7' extend downwardly from the rear ends of the side bars 4 and 5. Posts 8 and 9 extend straight up from the forward ends of the side bars 4 and 5 and are connected together by braces 10. Ladder bars 11 and 12 extend upwardly from the rear ends of the side bars 4 and 5, said ladder bars being inclined forwardly to an angle of about sixty degrees from a horizontal plane. A brace 13 is inserted between the rear ends of the side bars 4 and 5 near the lower ends of the ladder bars 11 and 12. Rungs 14 are inserted between the bars 11 and 12 to form steps for the ladder. Braces 15 and 16 connect the upper ends of the ladder bars 11 and 12 to the upper ends of the posts 8 and 9. A spindle 17 is inserted horizontally and transversely through the bars 15 and 16 and carries a roller 18. Intermediate posts 19 and 20 are inserted vertically between the side bars 4 and 5 and the ladder bars 11 and 12, the upper ends of said posts being slightly below and back of the center of the ladder. A spindle 21 is inserted through the posts 19 and 20 and a roller 22 is mounted upon the spindle in running alinement with the roller 18. A belt 23 is mounted upon the rollers 18 and 22, said belt being provided with pockets 24, and said pockets are arranged so that they will open upwardly on the down side of the belt. An inclined spout 25 is mounted to lead from below and behind the roller 22 forwardly over the axle 3. An extension spout 26 is hinged to the forward end of the spout 25 by pins 27 and is adapted to swing downwardly to the position shown in Fig. 1 and produce an extension of the spout 25. A pin 28 extends outwardly from the side of the extension spout 26 and a hook 29 is secured to the side of the spout 25, so that the extension spout 26 may be swung to a vertical position and the hook 29 engaged with the pin 28 so as to make a stop or gate across the end of the spout 25.

In the operation, the fruit ladder and conveyer is manipulated like a wheel barrow and moved to the desired location relative to the fruit tree, and the operator goes up the ladder and picks the fruit from the tree and drops the fruit one by one into the pockets 24. The weight of the fruit will cause the belt to travel in the direction indicated by the arrow 30 and carry the fruit downwardly until the pockets pass under the roller 22. Then the fruit will be dropped upon the spout 25 and roll down the spout and be discharged into the basket 31. When the basket 31 has been filled to the desired extent, the extension spout 26 is elevated to its vertical position, the hook 29 applied to the pin 28, and the spout 25 may be filled with fruit while the basket 31 is being removed and another one supplied.

Various changes may be made in the details of construction without departing from the spirit of my invention as claimed.

I claim:

1. A fruit ladder and conveyer comprising an axle, wheels upon the axle, bars extending horizontally backwardly from the axle, a ladder extending upwardly from the rear ends of the bars, a conveyer extending from the upper end of the ladder downwardly, a spout extending from below the lower end of the conveyer forwardly over the axle, and an extension spout leading from the forward end of the spout and hinged to the spout so that it may be swung to a vertical position to form a gate.

2. A fruit ladder and conveyer comprising means forming a frame, a ladder mounted upon the frame, a conveyer mounted upon the frame, a spout leading from below the conveyer, and an extension spout leading from the forward end of the spout and hinged to the spout so that it may be swung to a vertical position to form a gate.

In testimony whereof I have signed my name to this specification.

JAMES D. DAVIS.

Copies of this patent may be obtained for five cents each, by addressing the "Commissioner of Patents, Washington, D. C."